United States Patent [19]

Opsahl

[11] Patent Number: 4,601,446
[45] Date of Patent: Jul. 22, 1986

[54] AIRCRAFT DOOR COUNTERBALANCE SYSTEM

[75] Inventor: Allan W. Opsahl, Renton, Wash.

[73] Assignee: The Boeing Company, Seattle, Wash.

[21] Appl. No.: 537,727

[22] Filed: Sep. 29, 1983

[51] Int. Cl.$^4$ ................................................ B64C 1/14
[52] U.S. Cl. ................................. 244/129.5; 16/289; 16/306; 49/386
[58] Field of Search ............. 244/129.5, 137 R, 118.1, 244/118.3; 49/386, 445, 40, 339, 340, 248; 16/1 R, 1 C, 286–289, 306

[56] References Cited

U.S. PATENT DOCUMENTS

| | | | |
|---|---|---|---|
| 2,198,346 | 4/1940 | Little | 16/1 C |
| 2,327,026 | 8/1943 | Deuring | 16/289 |
| 2,605,494 | 8/1952 | Lyons et al. | 16/1 C |
| 2,739,343 | 3/1956 | Rahn | 16/287 |
| 3,561,162 | 2/1971 | Goldman | 49/386 |
| 3,591,111 | 7/1971 | Spence | 244/137 R |
| 3,718,171 | 2/1973 | Godwin | 244/129.5 |
| 3,999,245 | 12/1976 | Bue et al. | 16/289 |
| 4,350,382 | 9/1982 | Spronck | 49/386 |

Primary Examiner—Galen L. Barefoot
Attorney, Agent, or Firm—Hughes & Cassidy

[57] ABSTRACT

A compact, spring actuated, counterbalance system (10) for relatively large, inwardly opening aircraft bulk cargo doors (11) and similar closures of the type adapted to be pivoted about a horizontal hinge axis (12) oriented along the upper edge of the door (11) which is of the type commonly shifted through angles on the order of about 50° between fully closed and fully opened positions and employing: (i) an overhead conventional type compression spring assembly (15) including a housing (20), a spring actuator (21) movable axially through the housing (20), and an axially compressible spring assembly ($19_a$–$19_d$) bottomed at one end on the housing (20) and at its opposite end on the spring actuator (21); (ii) a bell crank assembly (16) having a bell crank (24) pivotally mounted on the overhead aircraft structural frame (18) and having a pair of angularly related crank arms ($24_a$, $24_b$); (iii) a control link (25) pivotally connected at one end to one of the angularly related crank arms ($24_b$) and pivotally connected at its opposite end to the aircraft door (11); and (iv), a cable (22) coupled at one end to the spring actuator (21) and extending axially through the spring assembly ($19_a$–$19_d$) and the spring housing (20) and having its opposite end connected to the other of the crank arms ($24_a$).

14 Claims, 6 Drawing Figures

AIRCRAFT DOOR COUNTERBALANCE SYSTEM

BACKGROUND OF THE INVENTION

1. Technical Field

The present invention relates generally to aircraft doors; and, more particularly, to aircraft doors of the type oriented for pivotal movement about a generally horizontal hinge line between a first closed position where the door—for example, a bulk cargo door—lies in a generally downwardly and inwardly inclined plane flush with the plane of the aircraft's fuselage, and a second open position where the door is pivoted inwardly to a generally horizontal position in close proximity to the bulk cargo compartment overhead—i.e., the undersurface of the passenger compartment deck. In its principal aspects, the invention relates to an improved counterbalance system for such aircraft doors—doors which may vary widely in terms of size, weight and location dependent upon the type and size of the particular aircraft within which they are installed—which is characterized by its ability to maintain requisite manually exerted operational forces at levels consistent with the normal capabilities of the average cargo attendant or handler who is required to manually move such doors between closed and open positions.

2. Background Art

Prior to the advent of the present invention, the problems inherent in manual operation of aircraft bulk cargo doors and similar relatively large closure members adapted to pivot inwardly about a horizontal axis have resulted in various proposals for spring actuated counterbalance systems for storing the energy required to counterbalance the changing gravitational moment created as such a door is pivoted about its horizontal hinge axis between a first closed position wherein the door lies in a downwardly and inwardly inclined plane where hinge moments are of least consequence, and a second open position where the door lies in a generally horizontal plane, thus producing significant gravitational hinge moments attributable to the weight and size of the door which must be manually overcome by the cargo attendant during a door-opening operation and manually resisted by the attendant during a door-closing operation.

One of the most common and widespread "solutions" to this problem has involved the use of a counterbalance system employing: (i) a horizontal guide tube containing coaxial end-to-end compression springs for storing the energy required to counterbalance the door's gravitational hinge moment; (ii) a double differential pulley; (iii) a first cable coupled at one end to a spring actuator within the guide tube and having its opposite end coupled to one track or groove in the double differential pulley, such groove having a variable pitch radius; (iv) a second cable coupled at one end to the door and having its opposite end coupled to a second track or groove in the double differential pulley, and also having a variable pitch radius; and (iv), a plurality of idler pulleys about which respective ones of the first and second cables are trained. The ratio of the variable pitch radii in the double differential pulley and the magnitude of spring load are tailored to provide the desired counterbalance moment to effectively balance or minimize the gravitational hinge moment that must be overcome and/or resisted by the cargo attendant at each different position of the cargo door as it is shifted between its fully opened and fully closed positions. In terms of "solving" the gravitational hinge moment problem, per se, the foregoing counterbalance system has proven highly effective and is in use today on many large commercial aircraft.

Unfortunately, however, the foregoing counterbalance system is characterized by a number of inherent disadvantages. For example, such systems are relatively complex and, therefore, relatively expensive, requiring two cables, a differential pulley (which is normally oriented in a plane parallel to and closely adjacent the bulk cargo compartment overhead due to serious space constraints), a pair of cables, and multiple idler pulleys. More important, however, the cables are subject to wear at numerous localized regions as a result of cable flexure at those points where the cables are required to wrap about the idler pulleys and the double differential pulley; and, indeed, the system inherently requires that such localized regions of the cables flex several times during each door opening/closing cycle, thus resulting in severe wear and reduced cable life. Of even greater significance is the problem inherent in the double differential pulley arrangement which requires that the cables oscillate as they are "paid on" and "paid off" the variable pitch diameter grooves in the pulley where such oscillation results in misalignment of the cables and pulley grooves, jamming of the counterbalance system, continually changing degrees of wrap about idler pulleys, and resultant wear of the cables and pulleys. Moreover, the space constraints within which such counterbalance systems must operate have heretofore dictated that the idler pulleys and double differential pulley have relatively small diameters—indeed, the idler pulleys are generally only about 2.5 inches in diameter—a factor further contributing to cable wear and shortened cable life.

Yet, notwithstanding the foregoing disadvantages, all of which impose severe maintenance problems and expenses, the two-cable double differential pulley counterbalance system has, until the present invention, presented the most satisfactory approach to the problem and is in widespread use today.

The prior art is, of course, replete with spring actuated counterbalance systems pertaining to a wide variety of closure mechanisms and the like. One such disclosure of interest is that found in U.S. Pat. No. 2,605,494—Lyons, Jr., et al. This system is said to be intended for use as a counterbalance mechanism for hinged hatch covers, bulkhead covers, box covers and the like; and, has been designed for use with outwardly opening covers. The system employs a pair of relatively long brackets mounted on opposite sides of the interior of the cover and which are angularly related thereto; a pair of grooved pulleys mounted on the side panels or bulkheads of the structure; a pair of tension springs, each coupled at one end to the inner surface of the cover; and, a pair of cords or cables secured at one end to the free ends of respective ones of the pair of springs, trained about respective ones of the grooved pulleys, and secured at their opposite ends to respective ones of the brackets. Thus, when the cover is swung to the open position, the relaxed springs tend to hold the cover open; and, during closure of the cover, the operator grasps the cover and pulls it downwardly with sufficient force to overcome the forces imposed by the tension springs.

Other patents of purely incidental interest include, for example, U.S. Pat. No. 4,350,382—Spronck [a balancing system for a foldable platform sideboard rotatable about a horizontal axis]; U.S. Pat. No. 4,165,121—Hori, et al [an actuating mechanism for an outwardly opening side plate on a vehicular loading box]; U.S. Pat. No. 3,561,162—Goldman [a spring actuating mechanism for an outwardly opening hatch door]; U.S. Pat. No. 3,503,092—Welch [a spring actuated counterbalance mechanism for a door rotatable about a vertical hinge axis]; U.S. Pat. No. 3,453,779—Reifenberg [a counterbalance system for an outwardly and downwardly opening appliance door]; U.S. Pat. No. 3,304,670—Logan [a spring counterbalance system for campers and the like having telescopically mounted components]; U.S. Pat. No. 3,303,613—Seuntjens [a spring actuated gate restoring system for gates of the type adapted to be opened by vehicle impact]; U.S. Pat. No. 2,598,888—Capra [a luggage opening system]; U.S. Pat. No. 2,425,365—Davidson [a counterbalance system for holding doors in selected ones of a plurality of positions]; U.S. Pat. No. 2,394,922—Levy [a furnace door balancing system]; U.S. Pat. No. 1,657,466—Frederick [a window operating device employing sash weights and interconnecting linkages]; U.S. Pat. No. 1,594,219—Stockstrom [an oven door operating mechanism]; and, U.S. Pat. No. 1,489,548—Roberts, et al [a spring operated window operating mechanism].

In general, the foregoing patented approaches pertain to counterbalance systems for outwardly opening doors of the type adapted to be pivoted about either a horizontal axis or a vertical axis, or to counterbalance systems for a vertically reciprocable closure member such as a window. While perhaps effective for their intended purposes, they have not been designed for use in connection with the problems inherent with relatively large, heavy, inwardly opening aircraft doors; nor are they capable of solving the problems inherent with such doors. As a consequence, despite the innumerable approaches taken by such prior patentees, prior to the present invention the most commonly accepted and used counterbalance system which has been and is being employed with inwardly opening aircraft doors pivoted for movement about their upper horizontal edges has been the foregoing dual cable, double differential pulley system—this notwithstanding the cable failure problems inherent with such systems.

SUMMARY OF THE INVENTION

A simple, yet highly effective, spring actuated counterbalance system for relatively large, inwardly opening aircraft bulk cargo doors and similar closures of the type adapted to be pivoted about a horizontal hinge axis oriented along the upper edge of the door—doors which are commonly required to be shifted through angles on the order of about 50° as they are shifted between fully closed and fully opened positions—employing: (i) an overhead conventional type compression spring assembly for storing energy to counterbalance and effectively minimize changing, but significant, gravitational door hinge moments; (ii) a bell crank pivotally mounted on the overhead structure; (iii) a control link affixed at one end to the door and at its opposite end to the bell crank; (iv) a single relatively large diameter idler pulley; and (v), a single cable coupled at one end to a spring actuator in the spring assembly and at the other end to the bell crank; and, wherein all actuating components effectively lie within, and operate within, a single vertical plane, the single cable is subjected to only minimal flexure and wrap about a relatively large diameter pulley, and the single cable is not subjected to multiple localized regions of flexure and wear but, rather, is subjected to only minimal flexure over a relatively long cable span and is flexed only once for each door opening cycle and for each door closing cycle. The counterbalance system of the present invention does not require a double differential pulley; and, because the system components are oriented in a single vertical plane, there is no cable oscillation and no tendency for misalignment and/or off-tracking of the cable with respect to the idler pulley.

More specifically, it is a general aim of the present invention to provide a highly simplified, yet highly effective, spring actuated counterbalance system for relatively large inwardly opening aircraft cargo doors and the like which overcomes all of the disadvantages in prior counterbalance systems heretofore employed, and which is characterized by its reliability in operation, long operating life for the actuating components, and reduced maintenance, weight and cost.

In another of its important aspects, it is an object of the invention to provide an inwardly and upwardly opening aircraft door counterbalance system of the foregoing character which allows all counterbalance components to be mounted in, and operated in, a single plane, thereby eliminating the tendency for cables to oscillate and to off-track from their pulleys and/or actuating mechanism, thus virtually eliminating the tendency for such doors to jam and/or for the counterbalance system components to fail.

Another important objective of the invention is the provision of a spring actuated counterbalance system which employs only a relatively few components which can be mounted in close proximity to an aircraft cargo compartment overhead structure, thereby permitting the cargo door to be easily pivoted through a full range of door opening/closing movement.

A more detailed object of the present invention is the provision of an aircraft door counterbalance system of the foregoing type which permits of ease in installation and maintenance, and which can be readily provided in kit form so as to enable retrofit of conventional counterbalance systems of the type presently employed on many commercial aircraft.

DESCRIPTION OF THE DRAWINGS

These and other objects and advantages of the present invention will become more readily apparent upon reading the following detailed description and upon reference to the attached drawings, in which.

Figure 1:
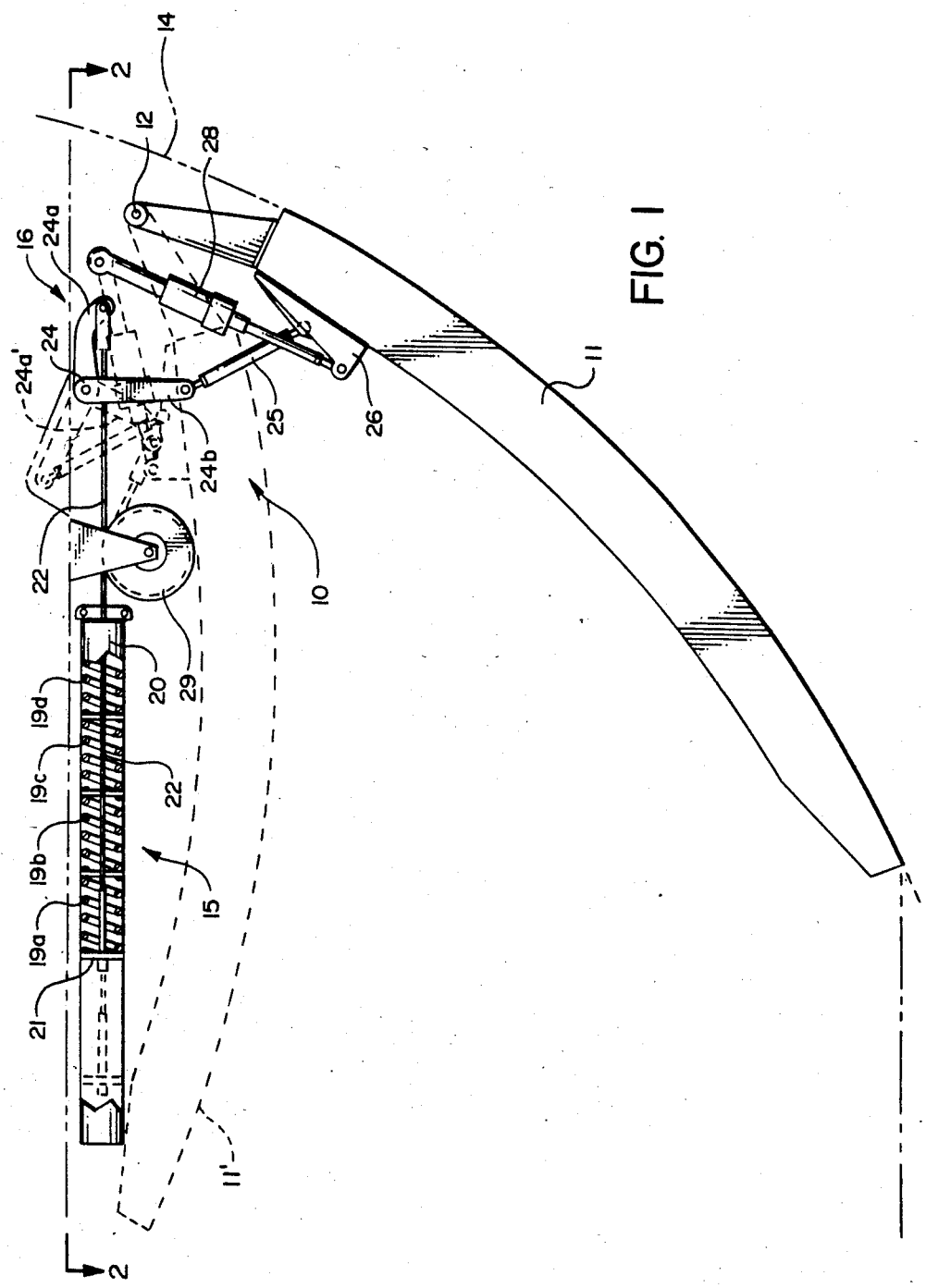
FIG. 1 is a highly diagrammatic fragmentary view taken transversely of an aircraft fuselage in the region of the bulk cargo compartment, here illustrating details of a spring actuated counterbalance mechanism embodying features of the present invention for use in counterbalancing an inwardly opening aircraft bulk cargo door which is hinged about its upper edge to the aircraft fuselage.

While the invention is susceptible of various modifications and alternative forms, a specific embodiment thereof has been shown by way of example in the drawings and will herein be described in detail. It should be understood, however, that it is not intended to limit the invention to the particular form disclosed but, on the contrary, the intention is to cover all modifications, equivalents and alternatives falling within the spirit and scope of the invention as expressed in the appended claims.

DETAILED DESCRIPTION

Referring first to FIG. 1, there has been illustrated a counterbalance system, generally indicated at 10, embodying the features of the present invention, and which is here intended for use in conjunction with an aircraft bulk cargo door 11, or similar relatively large heavy closure member which, when closed as shown in solid lines, depends from an overhead horizontal pivot axis 12 and generally lies in a plane coincident with the contour of the aircraft fuselage, here shown in phantom at 14. Those skilled in the art will appreciate that when employed with today's conventional wide-body aircraft, particularly in the aft bulk cargo compartment of such aircraft, that the aerodynamically streamlined and contoured aircraft fuselage 14 tends to fair rather rapidly inwardly and downwardly toward the longitudinal axis of the aircraft, as well as fairing inwardly and rearwardly. As a result of the rapidly converging aft frustoconical configuration of the fuselage structure, available cargo space is quite limited; and, consequently, the constraints placed on size and location of door actuating systems are quite severe. As here shown, the exemplary aft bulk cargo door 11 is of the type which, when closed, defines an included angle with a vertical plane extending through its pivot axis 12 of about 40° when viewed in the fore/aft direction; and, when shifted to the fully open position shown in broken lines at 11' in FIG. 1, lies in a generally horizontal plane in close proximity to the overhead support structure (not shown in FIG. 1) in the bulk cargo compartment. As a consequence of this arrangement, the door 11 is normally moved through an operating range of approximately 50° as it is shifted about pivot axis 12 between its fully closed solid line position shown at 11 in FIG. 1 and its fully open position shown in broken lines at 11'.

Of course, as the ensuing description proceeds, those skilled in the art will appreciate that the particular degree of door movement is not critical to the invention and may vary significantly through angles greater and/or less than the illustrative arrangement of approximately 50°. However, regardless of the degree of door closing movement, when fully open the door 11 will normally lie in a generally horizontal plane, at which point it is physically connected to the aircraft fuselage structure along the pivot axis 12 at the upper end of the door—an axis which is at the outboard edge of the fully open door. Such doors will commonly weigh on the order of at least 180 pounds, and are commonly on the order of at least 48 inches in width—i.e., the fore/aft dimension of the door—and at least 50 inches in contoured height for closing an ingress/egress opening in the aircraft which is on the order of 48 inches in width and, perhaps, about 42 inches in vertical height. Thus, it will be appreciated that the door 11, when in the fully open position shown at 11' in FIG. 1, is supported from its upper outboard edge in cantilever fashion, thus producing a significant gravitational hinge moment which must be overcome by the cargo attendant when attempting to open the door, resisted by the cargo attendant when closing the door, and balanced or otherwise compensated in order to maintain the door in its fully open position during cargo off-loading and/or cargo on-loading.

In accordance with one of the important aspects of the present invention, a spring actuated door counterbalance system 10 has been provided which is characterized by its simplicity, compactness, and use of relatively few components which are subject to only limited wear in use; yet, which is highly effective in counterbalancing the significant and constantly changing hinge moments attributable to the weight of the door 11 as it is manually shifted by a cargo attendant between its fully closed and fully opened positions. To accomplish this, the counterbalance system 10 of the present invention employs: (i) a compact compression spring assembly, generally indicated at 15 in FIGS. 1, 2, 4 and 5, which is of completely conventional construction; and (ii), a bell crank assembly, generally indicated at 16; each of which are mounted on and supported from the overhead cargo compartment ceiling structure (not shown in FIG. 1, but depicted at 18 in FIGS. 3, 4 and 5). As will be noted in FIGS. 1, 4 and 5, the compact spring assembly 15 includes a plurality of coaxial compression springs $19_a$, $19_b$, $19_c$, $19_d$, disposed in end-to-end relation within a guide tube or housing 20, and wherein spring $19_a$ is bottomed on a plug, plate or other longitudinally movable spring actuator 21 having an actuating cable 22 coupled at one end to actuator 21 and extending coaxially through the springs $19_a$–$19_d$ and guide housing 20, and being coupled at its opposite end to one arm $24_a$ of a bell crank 24 which forms part of the bell crank assembly 16.

Figure 3:
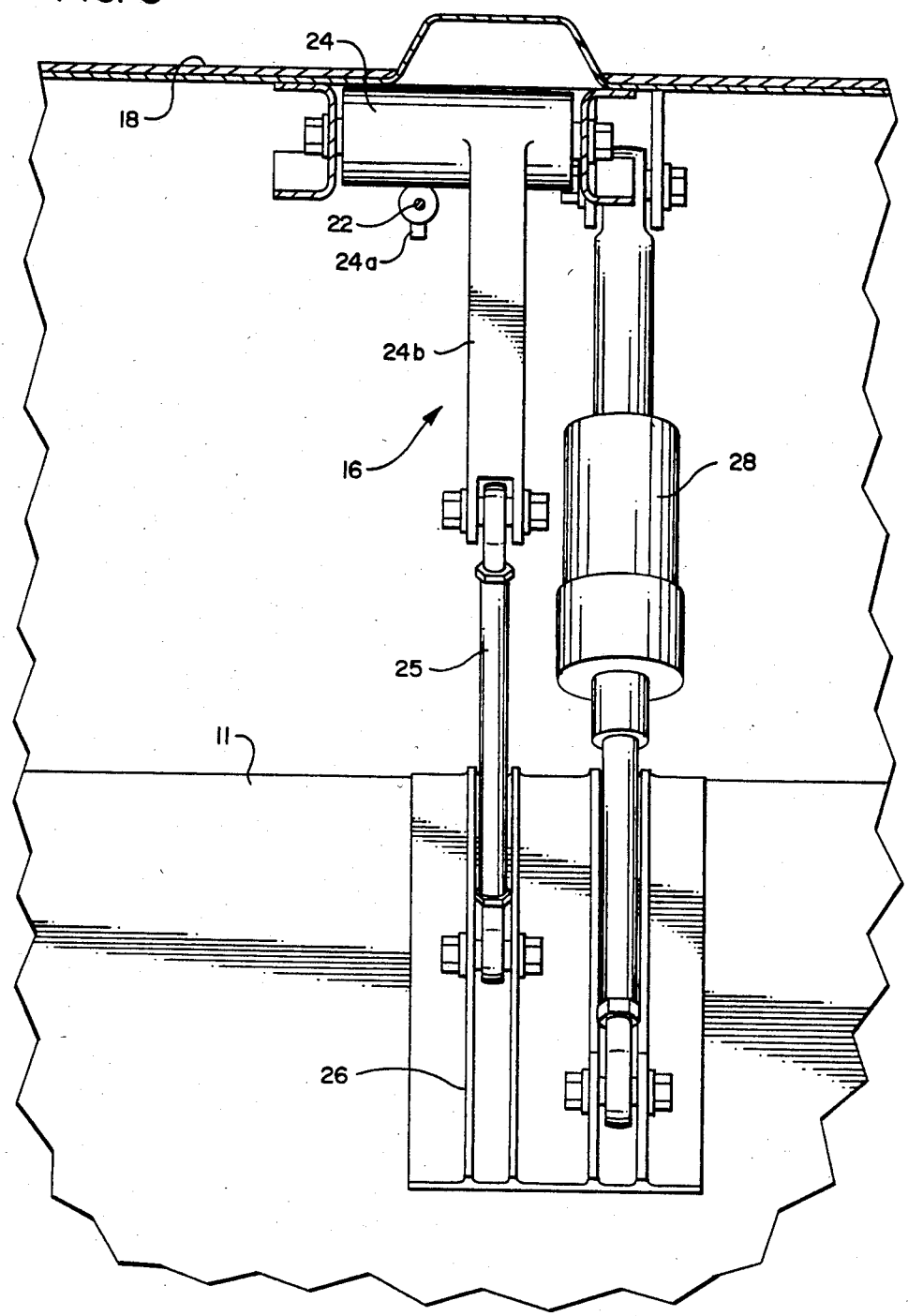
FIG. 3 is a fragmentary sectional view taken substantially along the line 3—3 in FIG. 2 and illustrating further details of the counterbalance assembly of the present invention.
Figure 4:
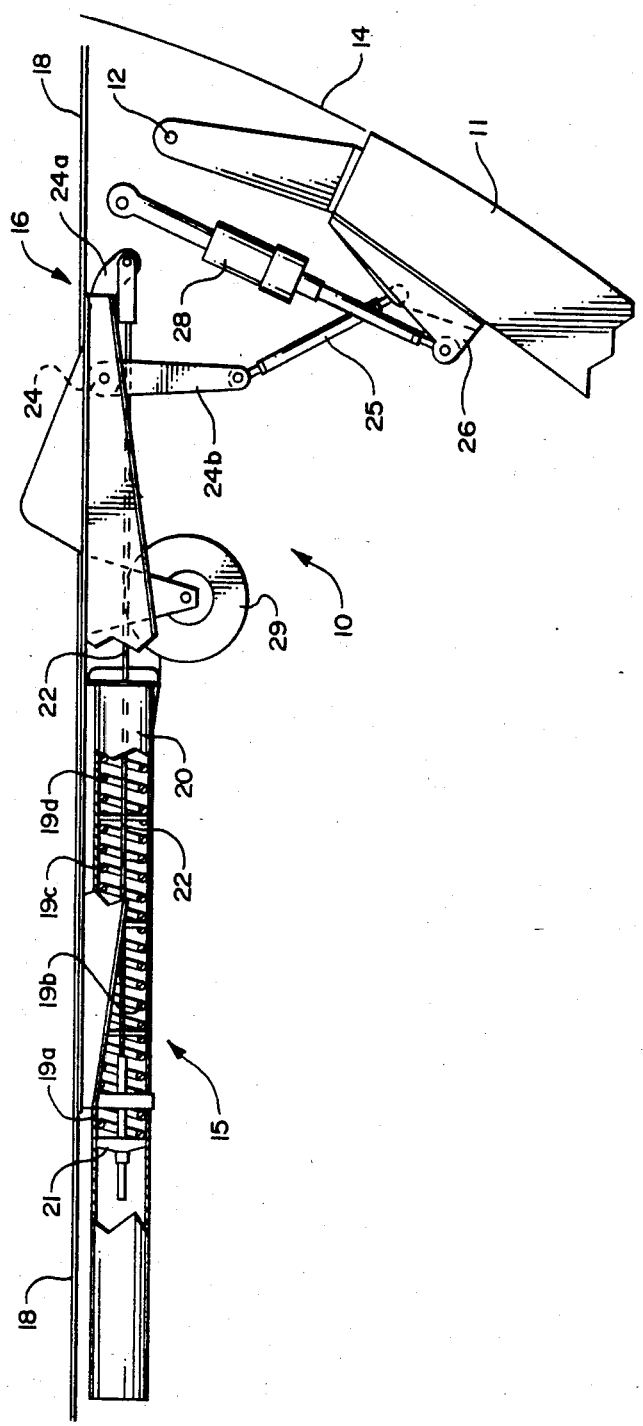
FIG. 4 is a fragmentary view similar to that shown in FIG. 1 and here illustrating the position of the fully compressed counterbalance spring and the associated actuating linkages when the bulk cargo door is fully closed.

In carrying out the present invention, bell crank 24 is provided with a second arm $24_b$ disposed at generally right angles to arm $24_a$ and to which is attached one end of a control link 25 having its opposite end coupled to a bracket 26 mounted centrally on the inner upper edge of door 11. The illustrative and exemplary door counterbalance system 10 is further provided with a completely conventional snubber mechanism 28 coupled at one end to bracket 26 and at its upper end to the overhead aircraft structural frame 18 (FIG. 3), which snubber 28 functions in a manner well known to those skilled in the art to retard and brake the door 11 as it moves downwardly from a fully open position (FIGS. 1 and 5) towards a fully closed position (FIGS. 1 and 4). Cable 22 is trained over a relatively large diameter—viz., approximately 5.5 inches—idler pulley 29 which serves to maintain alignment of the cable 22 centrally along the longitudinal axis of guide housing 20. As will be noted upon inspection of FIGS. 1 and 4, the idler pulley 29 is positioned such that when door 11 is fully closed, cable 22 is tangential to the base of the groove in the pulley—i.e., the cable extends along a straight horizontal line from spring actuator 21 to bell crank arm $24_a$ with no curvature or "wrap" about pulley 29. And, as can be best noted upon reference to FIG. 2, guide housing 20, cable 22, bell crank arm $24_a$, and pulley 29 all lie in a common vertical plane, thereby insuring that the cable moves along a lineal path totally devoid of lateral oscillation during opening and/or closing of door 11.

Figure 2:
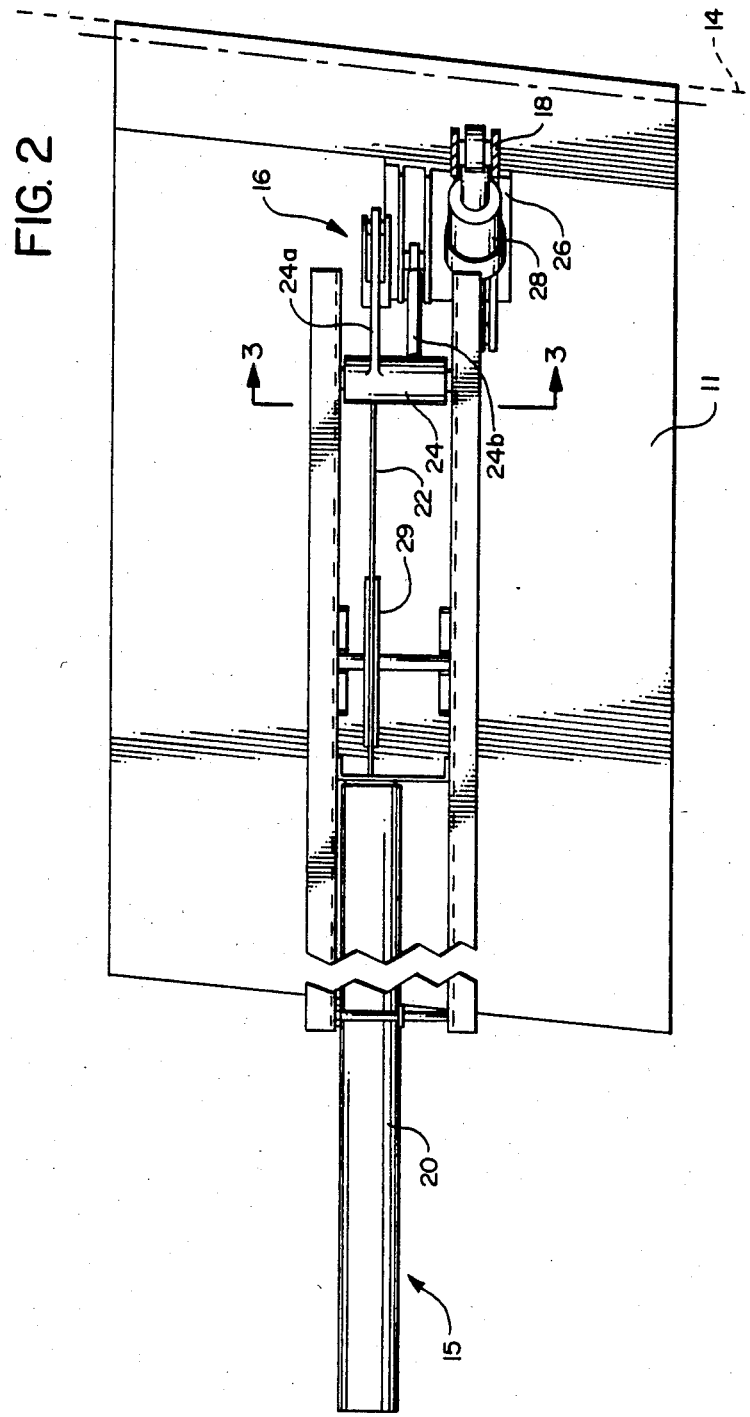
FIG. 2 is a fragmentary plan view taken substantially along the line 2—2 in FIG. 1 and illustrating details of the counterbalance assembly of the present invention.
Figure 5:
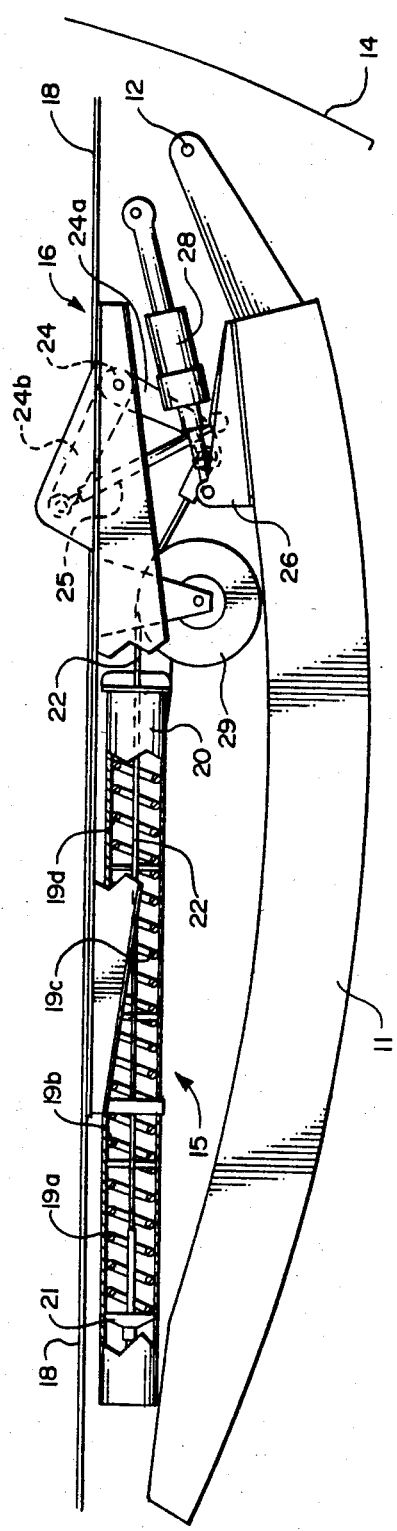
FIG. 5 is a fragmentary view similar to FIG. 4, but here illustrating the counterbalance spring and actuating linkages in the position occupied when the bulk cargo door is fully open; and, FIG. 6 is a graphic representation of the forces required to open and close the aircraft bulk cargo door when manufactured in accordance with the present invention, here illustrating the angular position of the door in degrees (0° being representative of a fully closed door and approximately 50° being representative of a fully open door) along the abscissa, and hinge moment—i.e., the requisite force to move the door—in inch/lbs. along the ordinate.

Thus, considering FIGS. 1, 4 and 5 conjointly, the arrangement is such that when door 11 is fully closed (the solid line position in FIG. 1; and, as shown in FIG. 4), bell crank 24 is positioned with arm $24_a$ extending horizontally to the right as viewed in the drawing, thus shifting spring actuator 21 to its extreme right-hand position, fully compressing springs $19_a$–$19_d$ within guide housing 20 and, consequently, storing energy therein. When the cargo attendant begins to open the door 11 and shift it towards its fully open position—i.e., the broken line position 11' in FIG. 1 and the position shown in FIG. 5—the door begins to rotate inwardly and to the left as viewed in the drawings (i.e., in a clockwise direction about pivot axis 24). Such movement serves, through control link 25 and bell crank arm $24_b$, to rotate bell crank 24 about its stationary axis, allowing bell crank arm $24_a$ to rotate in a clockwise direction towards the solid line position of FIG. 5 and the broken line position shown at $24_a'$ in FIG. 1. As the door opens, and the bell crank 24 rotates, the energy stored in the compressed springs $19_a$–$19_d$ is gradually expended; and, is used, together with the moment arms defined by the bell crank arms $24_a$, $24_b$, to counterbalance the increasing hinge moment of the door 11 and, thus, to minimize the physical exertion required by the cargo attendant. When in the fully open position shown in FIG. 5, the degree of cable 22 flexure or "wrap" about the relatively large diameter pulley 29 is quite limited and, as evident from FIG. 2, is confined to a single vertical plane, thus minimizing cable and/or pulley wear.

During door closing movement, the bell crank 24 rotates in a counterclockwise direction as viewed in the drawings and, consequently, the cable connection between arm $24_a$ and spring actuator 21 serves to shift the actuator to the right, thus again compressing springs $19_a$–$19_d$ and storing energy therein. And, of course, the springs, in conjunction with snubber 28, serve to retard or brake the door 11, preventing excess rates of door closure and/or damage to any of the door actuating components.

Figure 6:
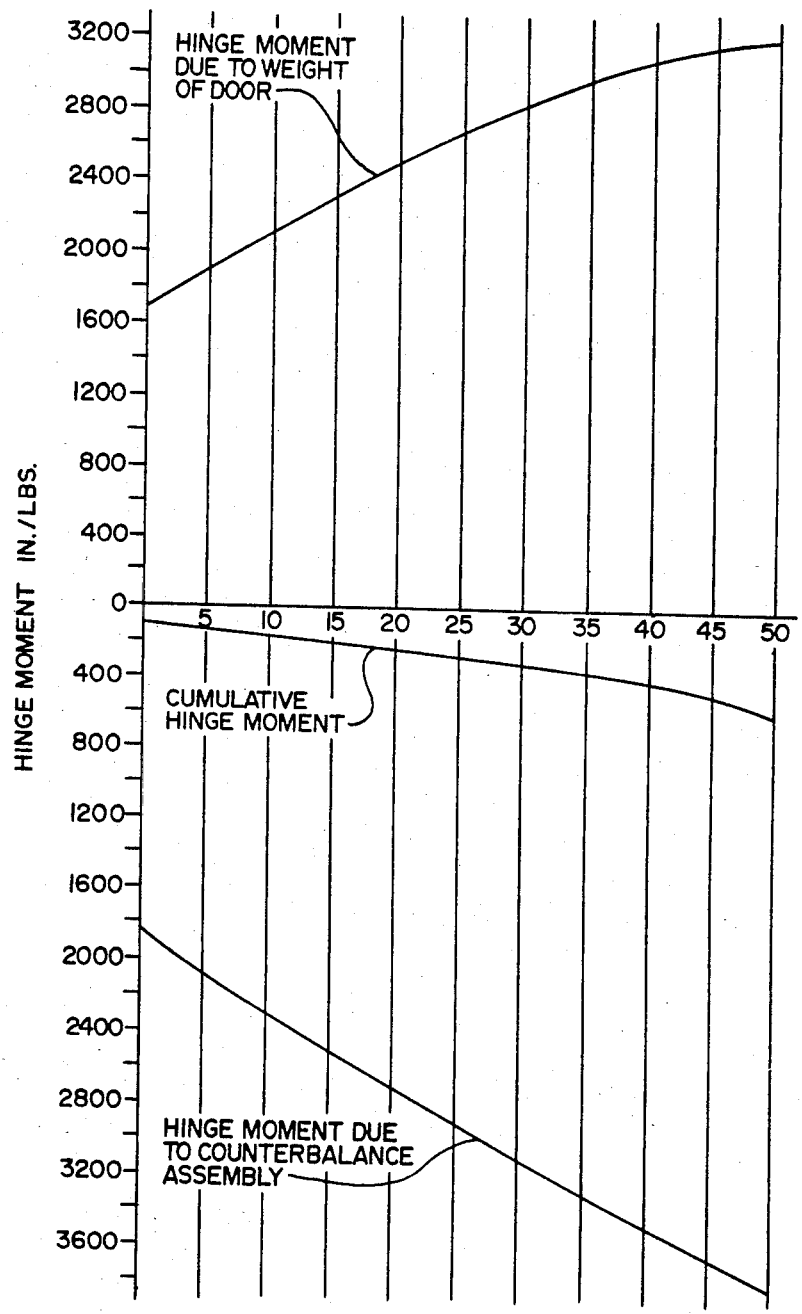

It will, of course, be understood that the spring actuated counterbalance system can be tailored to meet any desired operating requirements by judicious selection of the springs $19_a$ through $19_d$ and dimensioning and/or positioning of the bell crank arms $24_a$, $24_b$. As best shown in FIG. 6, the exemplary door 11 has a size and weight such that it establishes a gravitational hinge moment ranging from about 1700 in./lbs. when the door is fully closed—i.e., at the 0° position—to about 3200 in./lbs. when fully opened. Consequently, in the illustrative form of the invention, the springs $19_a$–$19_d$ are selected, and the bell crank arms $24_a$, $24_b$ are dimensioned, so as to provide a counterbalance hinge moment ranging from about −1800 in./lbs. when the door is fully closed to about −3800 in./lbs. when fully opened—it being understood that hinge moment attributable to the counterbalance system 10 is a function of the spring characteristics, and the lengths, positions, and angular relations of the bell crank arms $24_a$, $24_b$, all parameters which can be designed to provide desired optimum results. As shown in FIG. 6, the net result is a cumulative hinge moment ranging from about −100 in./lbs. when the door is fully closed to about −600 in./lbs. when the door is fully open, thereby minimizing the manually applied forces required of the cargo attendant and insuring that the door 11 remains open during cargo off-loading and on-loading operations.

Thus, those skilled in the art will appreciate that there has herein been described a simple, lightweight, compact, economical spring actuated counterbalancing system which is highly effective and reliable and which employs a minimum of components. The system requires only a single actuating cable and only a single relatively large diameter idler pulley. Undesired flexure of the cable is maintained at a minimum and is confined to a single plane, thereby minimizing wear on the cable and prolonging cable life. Moreover, the system can be easily installed and/or serviced; and, indeed, can be readily packaged in kit form to permit retrofit of existing counterbalance systems.

What is claimed is:

1. In combination with an aircraft having a structural support frame defining an overhead compartment support frame, a fuselage defining an ingress/egress opening, and a door pivotally connected to said aircraft structural support frame adjacent its upper horizontal edge and adapted to be shifted inwardly and upwardly about said horizontal pivot axis towards said overhead structural support frame during door opening and to be shifted downwardly and outwardly about said axis towards said ingress/egress opening during door closure, an improved door counterbalancing system comprising:

(a) means defining a spring assembly secured to said overhead structural support frame, said spring assembly including a housing, a spring actuator mounted in said housing with freedom for movement axially therethrough, and axially compressible spring defining means mounted within said housing having one end bottomed on said actuator and the other end bottomed on said housing;

(b) a bell crank pivotally secured to said overhead structural support frame, said bell crank having first and second angularly related crank arms;

(c) a control link having one end secured to said aircraft door and its opposite end secured to one of said first and second angularly related crank arms; and, (d) means defining a cable coupled at one end to said spring actuator and extending through said axially compressible spring defining means and said spring housing, said cable defining means having its free end coupled to the other of said first and second angularly related crank arms;

said spring assembly, bell crank and control link being oriented relative to one another and relative to said door and said structural frame such that when said door is closed, said axially compressible spring defining means are fully compressed and energy is stored therein, and so that upon inward and upward pivotal movement of said door about said horizontal pivot axis, said control link causes said bell crank to rotate and reduces the distance between the connection of said cable defining means to the other of said first and second angularly related crank arms and said spring housing, permitting said fully compressed spring defining means to expand and expending the energy stored therein to counterbalance the increasing hinge moment attributable to the weight of said door as it is shifted inwardly and upwardly about said pivot axis.

2. The combination as set forth in claim 1 further including an idler pulley mounted on said overhead structural support frame, said cable defining means being tangentially engaged with said pulley.

3. The combination as set forth in claim 1 wherein said door counterbalancing system and said door define a cumulative hinge moment ranging from about $-100$ in./lbs. when said door is fully closed to about $-600$ in./lbs. when said door is fully open.

4. A spring actuated closure counterbalancing system adapted to be sold in kit form for use in counterbalancing a closure member pivotally connected along a horizontal pivot axis to overhead structural frame defining members, said closure counterbalancing system comprising, in combination:
(a) a spring assembly adapted to be secured to the overhead structural frame defining members, said spring assembly including a housing, a spring actuator mounted in said housing with freedom for movement axially therethrough, and axially compressible spring defining means mounted within said housing having one end bottomed on said actuator and the other end bottomed on said housing;
(b) a bell crank adapted to be pivotally secured to the overhead structural frame defining members and having first and second angularly related crank arms;
(c) a control link having one end secured to one of said first and second angularly related crank arms and adapted to have its second end coupled to the closure member; and,
(d) means defining a cable coupled at one end to said spring actuator and extending through said axially compressible spring defining means and said spring housing, said cable defining means having its free end coupled to the other of said first and second angularly related crank arms;
said spring assembly and bell crank adapted to be mounted on the structural frame defining members, and the free end of said control link adapted to be mounted on the closure member and being related to one another and to the structural frame defining members and the closure member such that when the closure member is closed, said axially compressible spring defining means are fully compressed and energy is stored therein, and so that upon inward and upward pivotal movement of the closure member about its horizontal pivot axis, said control link causes said bell crank to rotate and reduces the distance between the connection of said cable defining means to the other of said first and second angularly related crank arms and said spring housing, permitting said fully compressed spring defining means to expand and expending the energy stored therein to counterbalance the increasing hinge moment attributable to the weight of the closure member as it is shifted inwardly and upwardly about its pivot axis.

5. The combination as set forth in claim 4 where said closure counterbalancing system comprises a system for counterbalancing the hinge moment of a closure member which comprise an inwardly opening aircraft door.

6. The combination as set forth in claim 4 further including an idler pulley adapted to be mounted on the overhead structural frame defining members, said cable defining means being tangentially engaged with said pulley.

7. The combination as set forth in claim 4 wherein said closure counterbalancing system defines a counterbalancing hinge moment ranging from about 100 in./lbs. to about 600 in./lbs. greater than the hinge moment attributable to the weight of the closure member as the closure member is shifted from a fully closed to a fully opened position.

8. In combination with an aircraft having a structural support frame defining an overhead compartment support frame, a fuselage defining an ingress/egress opening, and a door pivotally connected to said aircraft structural support frame adjacent its upper horizontal edge and adapted to be shifted inwardly and upwardly about said horizontal pivot axis towards said overhead structural support frame during door opening and to be shifted downwardly and outwardly about said axis towards said ingress/egress opening during door closure, an improved door counterbalancing system comprising:
(a) means defining a spring assembly secured to said overhead structural support frame, said spring assembly including a housing, a spring actuator mounted in said housing with freedom for movement axially therethrough, and axially compressible spring defining means mounted within said housing having one end bottomed on said actuator and the other end bottomed on said housing;
(b) a bell crank pivotally secured to said overhead structural support frame, said bell crank having first and second angularly related crank arms;
(c) a control link having one end secured to said aircraft door and its opposite end secured to one of said first and second angularly related crank arms;
(d) an idler pulley mounted on said overhead structural support frame; and,
(e) means defining a cable coupled at one end to said spring actuator and extending through said axially compressible spring defining means and said spring housing, said cable defining means being tangentially engaged with said pulley and having its free end coupled to the other of said first and second angularly related crank arms so that said cable defining means extends in a straight line from said spring actuator to said other of said first and second angularly related crank arms when said door is fully closed and is wrapped around said idler pulley when said door is opened; said spring assembly, bell crank and control link being oriented relative to one another and relative to said door and said structural frame such that when said door is closed, said axially compressible spring defining means are fully compressed and energy is stored therein, and so that upon inward and upward pivotal movement of said door about said horizontal pivot axis, said control link causes said bell crank to rotate and reduces the distance between the connection of said cable defining means to the other of said first and second angularly related crank arms and said spring housing, permitting said fully compressed spring defining means to expand and expending the energy stored therein to counterbalance the increasing hinge moment attributable to the weight of said door as it is shifted inwardly and upwardly about said pivot axis.

9. The combination as set forth in claim 8 wherein said spring housing, cable defining means, idler pulley and said other of said first and second angularly related crank arms lie in a common vertical plane.

10. The combination as set forth in claim 8 wherein said door counterbalancing system and said door define a cumulative hinge moment ranging from about −100 in./lbs. when said door is fully closed to about −600 in./lbs. when said door is fully open.

11. A spring actuated closure counterbalancing system adapted to be sold in kit form for use in counterbalancing a closure member pivotally connected along a horizontal pivot axis to overhead structural frame defining members, said closure counterbalancing system comprising, in combination:
   (a) a spring assembly adapted to be secured to the overhead structural frame defining members, said spring assembly including a housing, a spring actuator mounted in said housing with freedom for movement axially therethrough, and axially compressible spring defining means mounted within said housing having one end bottomed on said actuator and the other end bottomed on said housing;
   (b) a bell crank adapted to be pivotally secured to the overhead structural frame defining members and having first and second angularly related crank arms;
   (c) a control link having one end secured to one of said first and second angularly related crank arms and adapted to have its second end coupled to the closure member;
   (d) an idler pulley adapted to be mounted on the overhead structural frame defining members; and,
   (e) means defining a cable coupled at one end to said spring actuator and extending through said axially compressible spring defining means and said spring housing, said cable defining means being tangentially engaged with said pulley and having its free end coupled to the other of said first and second angularly related crank arms so that said cable defining means extends in a straight line from said spring actuator to the other of said first and second angularly related crank arms when said closure member is fully closed and is wrapped around said idler pulley when said closure member is opened; said spring assembly and bell crank adapted to be mounted on the structural frame defining members, and the free end of said control link adapted to be mounted on the closure member and being related to one another and to the structural frame defining members and the closure member such that when the closure member is closed, said axially compressible spring defining means are fully compressed and energy is stored therein, and so that upon inward and upward pivotal movement of the closure member about its horizontal pivot axis, said control link causes said bell crank to rotate and reduces the distance between the connection of said cable defining means to the other of said first and second angularly related crank arms and said spring housing, permitting said fully compressed spring defining means to expand and expending the energy stored therein to counterbalance the increasing hinge moment attributable to the weight of the closure member as it is shifted inwardly and upwardly about its pivot axis.

12. The combination as set forth in claim 11 wherein said spring housing, cable defining means, idler pulley and said other of said first and second angularly related crank arms lie in a common vertical plane when installed.

13. The combination as set forth in claim 11 where said closure counterbalancing system comprises a system for counterbalancing the hinge moment of a closure member which comprises an inwardly opening aircraft door.

14. The combination as set forth in claim 11 wherein said closure counterbalancing system defines a counterbalancing hinge moment ranging from about 100 in./lbs. to about 600 in./lbs. greater than the hinge moment attributable to the weight of the closure member as the closure member is shifted from a fully closed to a fully opened position.

* * * * *